United States Patent [19]

Webb et al.

[11] 4,096,108
[45] Jun. 20, 1978

[54] THERMOSETTABLE RESINS AND FRICTIONAL MATERIALS MADE THEREFROM

[75] Inventors: Benton Paul Webb, Richwood; Donald Louis Nelson, Lake Jackson, both of Tex.

[73] Assignee: The Dow Chemical Company, Midland, Mich.

[21] Appl. No.: 687,132

[22] Filed: May 17, 1976

[51] Int. Cl.$^2$ ............................................. C08K 3/34
[52] U.S. Cl. ...................................... 260/38; 260/46; 260/52; 260/53 R
[58] Field of Search ......... 260/46, 52, 53 R, DIG. 39, 260/38

[56] References Cited
U.S. PATENT DOCUMENTS

| | | | |
|---|---|---|---|
| 2,853,460 | 9/1958 | Archibald | 260/46 X |
| 3,342,873 | 9/1967 | Doedens | 260/613 |
| 3,493,526 | 2/1970 | Smith | 260/52 X |
| 3,576,788 | 4/1971 | Harris et al. | 260/52 |
| 3,579,470 | 5/1971 | Runk | 260/52 |
| 3,959,194 | 5/1976 | Adelmann | 260/DIG. 39 X |
| 3,960,982 | 6/1976 | Numata et al. | 260/52 X |

*Primary Examiner*—Sandra M. Person

[57] ABSTRACT

Superior frictional materials are formed by heating under pressure in the presence of a filler, e.g., asbestos, and a source of formaldehyde, e.g., hexamethylenetetramine, the polymers formed by reacting (1) a mixture of compounds selected from the group having the formula

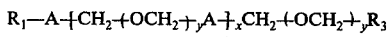

wherein each A is an independently selected aromatic radical having the formula

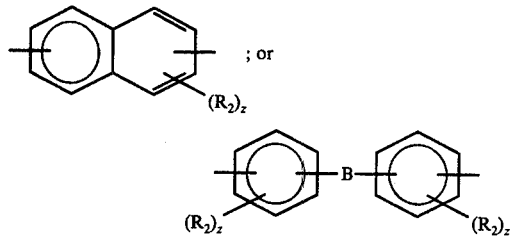

wherein each $R_1$ represents an independently selected radical from the group consisting of hydrogen, $-(CH_2-OCH_2-)_yR_3$; each $R_2$ represents an independently selected radical selected from the group consisting of $R_1$, halogen or an alkyl group of 1 to 10 carbon atoms; $R_3$ represents a radical selected from the group consisting of hydrogen, methoxy, ethoxy, propoxy or $-A-H$; $x$ represents an integer from 0 to 60; $y$ represents an integer from 0 to 4; $z$ represents an integer from 0 to 2; and B represents oxygen or sulfur; provided that if $x$ is 0 and A is diphenyloxide, then $y$ must be 1 or greater; which mixture may contain up to 50% by weight unreacted aromatic HAH; with (2) at least one monomeric reactant selected from the group

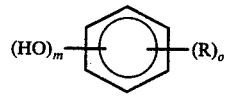

wherein R represents hydrogen, alkyl or aryl of 1 to 20 carbon atoms and

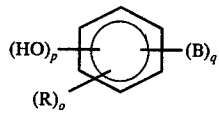

$m$ represents an integer from 1 to 3; $o$ represents an integer from 1 to 5; $p$ represents an integer from 0 to 3; B represents oxygen, sulfur or $C_1$ to $C_3$ alkylidene and $q$ represents an integer from 0 to 1; and finally with (3) formaldehyde in the presence of an acid catalyst at a temperature of from between about 90° C to about 190° C for from several minutes to several hours.

18 Claims, No Drawings

THERMOSETTABLE RESINS AND FRICTIONAL MATERIALS MADE THEREFROM

BACKGROUND OF THE INVENTION

Organic condensation products derived from halomethylated diaromatic ethers as well as from poly(methylol diaromatic ethers) to produce poly(methylene diaromatic ethers) are described in several U.S. patents, namely U.S. Pat. Nos. 2,911,380; 3,004,072; 3,000,839; 3,269,973 and 3,342,873. The polymers, prepared in accordance with these patents, have good thermal stability and are useful in molding potting and film forming applications. The techniques described in the literature, including the patent literature above set forth, have suffered from the by-product halogen acid produced at one stage or another. The production of the halogen acid creates a handling problem during manufacture as well as the difficulty in removing the traces of the acid from the final product. This would be especially deleterious in applications for frictional materials.

Manufacturers of brake linings currently use phenolic resins and resins made from cashew nut shell liquid (CNSL) as binders for the various asbestos and/or metal fillers involved. Thermal decomposition of these phenolic binders is the largest contributor to brake "fade" (lowering of the coefficient of friction with increasing temperature). This "fade" is a result of a molecularly thin layer of gases acting as a cushion at the brake lining/drum (or pad/rotor) interface. These gases result primarily from the decomposition of the binder. Thus, binders showing higher thermal stability should show reduced "fade."

Noise produced by the frictional material is another problem with present brake linings. Products useful as frictional materials according to the present invention show superior performance with respect to both of these problem areas.

BRIEF DESCRIPTION OF THE INVENTION

The present invention employs products made by reacting (1) a mixture of compounds selected from the group consisting of

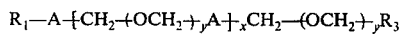

wherein each A is an independently selected aromatic radical having the formula

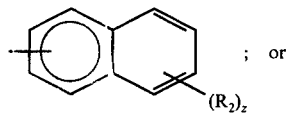

; or

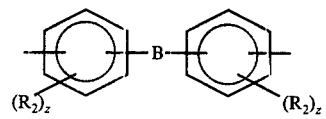

each $R_1$ represents an independently selected radical from the group consisting of hydrogen, $-CH_2-(-OCH_2-)_y R_3$; each $R_2$ respresents an independently selected radical selected from the group consisting of $R_1$, halogen or an alkyl group of 1 to 10 carbon atoms; $R_3$ represents a radical selected from the group consisting of hydrogen, methoxy, ethoxy, propoxy or $-A-H$; $x$ represents an integer from 0 to 60; $y$ represents an integer from 0 to 4; $z$ represents an integer from 0 to 2; and B represents oxygen or sulfur; provided that if $x$ is 0 and A is diphenyloxide, they $y$ must be 1 or greater; which mixture may contain up to 50% by weight unreacted aromatic HAH; with (2) at least one monomeric reactant selected from the group

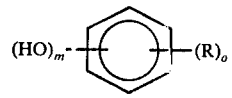

wherein R represents hydrogen, alkyl or aryl of 1 to 20 carbon atoms and

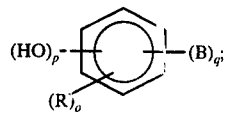

$m$ represents an integer from 1 to 3; $o$ represents an integer from 1 to 5; $p$ represents an integer from 0 to 3; B represents oxygen, sulfur or $C_1$ or $C_3$ alkylidene and $q$ represents an integer from 0 to 1; and finally with (3) formalehyde in the presence of (4) an acid catalyst at a temperature of from about 110° to 190° C for from several minutes to several hours. Temperatures above about 190° C may be employed but are not recommended as the reaction is difficult to control and the products are not uniformly reproducible. Good results have been obtained in the preparation of the thermoplastic resinous material when the condensation occurs at 140° to 165° C for 1 to 2 hours in admixture with about 0.2 to 0.3 weight percent of Friedel-Crafts acid catalyst and particularly the alkylated diphenyl oxide disulfonic acids. The solid products of this reaction are useful when they are further cured into a thermoset polymer by heating under pressure in the presence of a filler and of a formaldehyde source at from about 170° to about 260° C for from several minutes to several hours. Pressures employed are from about 500 to about 5000 psi and preferably from about 1500 to about 2500 psi.

A preferred thermoplastic resinous starting material is prepared by reacting a methoxy functional diaryl precursor in the presence of an acid catalyst with phenol, substituted phenols, cashew nut shell liquid resin and mixtures thereof together with formaldehyde to form the modified novolac resins, which are in turn reacted with additional formaldehyde (such as hexamethylenetetramine) in the presence of a filler material at a temperature of about 200° C under pressure to form the frictional materials of the present invention. The most preferred starting material employs the methoxy functional diphenyl oxide precursor (MFDPO), phenol and a minor amount of the cashew nut shell liquid with formaldehyde to make the modified novolac.

Catalysts employed in the reaction of making the thermoplastic resinous material (modified novolac) are oxalic acid, strong mineral acids and organic sulfonic acids. Most preferred are aromatic sulfonic acids.

The process of making the reaction (condensation) products which are the starting materials of the invention of Nelson, et al. U.S. application Ser. No. 445,513, filed Feb. 25, 1974 comprises heating to a temperature in the range of from about 50° to about 250° C a mixture of A. a diaryl compound selected from naphthalene its alkylated and/or halogenated derivatives alone or in combination with diphenyl oxide, diphenyl sulfide, their alkylated derivatives, their halogenated derivatives, or mixtures thereof,
B. formaldehyde,
C. water, and
D. an aliphatic hydroxy hydrocarbon compound having at least one free hydroxyl group and from 1-4 carbons in the presence of a catalytic amount of a strong acid catalyst wherein the amount of formaldehyde used ranges from about 1 to about 3 moles per mole of diaryl compound, the amount of water ranges from about 0.01 to about 2 moles per mole of diaryl compound and the amount of hydroxy hydrocarbon compound ranges from about 0.3 to about 10 moles per mole of diaryl compound.

The product made by the above process is the methoxy functional diaryl precursor referred to previously. This precursor is reacted with a phenolic compound and formaldehyde to form the thermoplastic resinous material (modified novolac resin) which is then ground and mixed with hexamethylenetetramine, or other formaldehyde source, together with an appropriate amount of filler (asbestos) and heated under pressure in a mold to a temperature within the range of about 170° to about 260° C for a time sufficient to cure to make the frictional materials of the present invention.

DETAILED DESCRIPTION OF THE INVENTION

The aromatic compounds which can be reacted with formaldehyde, water and alcohol to prepare the methoxy functional diaryl precursor useful in making the binders of the present invention are naphthalene, diphenyl ether (diphenyl oxide), and diphenyl sulfide. Reaction products can also be prepared from the alkylated derivatives of the foregoing wherein one or both aromatic rings are substituted by one or two alkyl groups of 1 to 10 carbon atoms each.

If desired, the aromatic compounds can be halogenated in one or both rings with fluorine, chlorine, bromine or iodine groups. Mixtures of the foregoing are also useful in this invention.

The above aromatic compounds are mixed and reacted with about 1 to about 3 moles of formaldehyde at a temperature range from about 50 to about 250° C in the presence of about 0.01 to about 2 moles of water per mole of diaryl ether and in the presence of about 0.03 to about 10 moles of an aliphatic hydroxy hydrocarbon compound having 1 to 4 carbon atoms and at least one free hydroxyl group.

The presence of water in the range recited above is essential to this invention since the use of amounts below this range results in very low yields of the desired reaction product while amounts greater than this amount result in greatly increased reaction times.

The above reaction proceeds readily in the presence of a catalytic amount of a strong acid catalyst. For the purposes of this reaction, a catalytic amount is defined as about 1 to about 20 mole percent of the strong acid based on the aromatic compound.

Examples of strong acid catalysts are sulfuric, phosphoric, p-toluene sulfonic acid, perchloric, alkylated diphenyl oxide disulfonic acid, and the like.

A commercial mixture of formaldehyde, methanol and water sold under the trade name of Methyl Formcel ® is a convenient source of the above formaldehyde reactant.

Examples of the above aliphatic hydroxy hydrocarbon compounds are: methanol, ethanol, propanols and butanols.

Fillers employed are asbestos, metal shavings, and other organic and inorganic materials currently used to form frictional materials. These are mixed with the binder resins and cured with a formaldehyde source under heat and pressure.

The following examples illustrate the preparation of the modified resins used as binders, the preparation of the frictional products therefrom and a comparison of the properties of the resins of the present invention and the frictional products made therefrom with those of the resins and frictional materials of the prior art.

EXAMPLE 1

A. Preparation of Modified Novolac Resins

An acid resistant vessel equipped with a stirrer, thermowell and Dean Stark Trap with a reflux condenser mounted on top was charged with the following materials:

1. 359.1 gm of MFDPO with equivalent weight 266
2. 470.0 gm of phenol
3. a catalyst comprising
   a. 1.8 gms of p-toluene sulfonic acid (PTSA)
   b. 2.4 gm of oxalic acid This mixture was slowly heated with stirring to 155° C and allowed to react unit 52 ml of methanol had collected in the Dean Stark Trap. The trap was removed, the reflux condenser mounted to the reaction vessel, and the reaction mixture allowed to cool to 100° C. At this time (4) 280.8 gm of 37% aqueous formaldehyde solution was added dropwise to the mixture over a 30 minutes period. After 1 hour, water was removed by distillation. Finally, the resulting resin was dehydrated by vacuum distillation at 25 mm Hg and at a temperature of 190° C. A hard, brittle solid was obtained at room temperature. The resin had a softening point of 85° C.

The resin was characterized as having 38.2% methylene bridged-diphenyl oxide, 56.8% phenolic component and 5.0% methylene bridges (—$CH_2$—).

B. Standard Novolac (Prior Art)

An acid-resistant vessel equipped with a stirrer, reflux condenser, dropping funnel and thermowell was charged with 207.0 gm phenol and 4.2 gm oxalic acid. This mixture was heated to 95° C and 142.8 gm of 37% aqueous formaldehyde was added dropwise over a 1 hour period. This mixture was allowed at react 1 hour. Water was removed by distillation and the resin dehydrated by vacuum distillation at 25 mm Hg and at a temperature of 190° C. A hard, brittle, solid was obtained at room temperature. The resin had a softening point of 95° C.

This prior art resin was characterized as having 90.7% phenolic component and 9.3% methylene bridges.

EXAMPLE 2

Comparison of Resin Cure Rate of Products in Example 1

In order to show that the modified resin (Ex. 1A) had cure properties similar to the standard novolac resin (Ex. 1B), each was ground to a fine powder with 15% by weight hexamethylenetetramine (Hexa). These powders were "stroke cured" on a hotplate at different temperatures and the time of gelation determined, a procedure well known in the phenolic resin industry. A plot of cure time vs. temperature is shown in Table I. At low temperature there is some difference in cure rate. As the temperature is increased, the cure rate is very much the same for the two resins. This behavior in cure rate is typical of modified phenolic resins.

TABLE I

| 1-A | | 1-B | |
| --- | --- | --- | --- |
| Temp. ° C | Cure Time, sec. | Temp. ° C | Cure Time, sec. |
| — | — | 144 | 120 |
| — | — | 150 | 75 |
| 166 | 60 | 163 | 41 |
| 175 | 30 | 178 | 20 |
| 187 | 19 | 185 | 16 |
| 192 | 17 | 195 | 12 |

EXAMPLE 3

Comparison of Thermal Stability

To compare the thermal stability of the resins prepared in Ex. 1, 8.5 gm of each powdered resin was mixed with 1.5 gm of Hexa and the mixture dissolved in 20 ml of a solvent composed of toluene and ethanol, 75/25 by volume. Two-ml portions of these solutions were placed in tared aluminum foil pans. The solvent was evaporated and the resins cured into this films by slowly heating from 40° to 225° C over a 24 hour period. The films were then placed in an oven at 260° C for 1 hour, cooled and weighted. These film weights were used as initial weights for future weight loss calculations.

The films were returned to the 260° C oven and removed at various time intervals, weighed, and percent weight loss calculated. The films were left in the 260° C oven for a total of 500 hours.

A comparison of percent weight loss vs. time is shown in Table II. During the first 25 hours the standard novolac resin (Ex. 1B) showed a significantly higher rate of weight loss than the MFDPO-modified novolac (EX. 1A). After the 500 hour exposure period, the modified novolac had lost 54% less weight than the standard novolac, thus showing substantially improved thermal stability of the Ex. 1A resin.

TABLE II

| 1-A | | 1-B | |
| --- | --- | --- | --- |
| Hours at 500° F | % Wt. Loss | Hours at 500° F | % Wt. Loss |
| 24 | 2.0 | 24 | 6.2 |
| 48 | 2.4 | 48 | 7.4 |
| 72 | 2.9 | 72 | 8.3 |
| 168 | 4.1 | 168 | 10.9 |
| 335 | 6.2 | 335 | 14.3 |
| 500 | 8.0 | 500 | 17.5 |

EXAMPLE 4

A. MFDPO-Modified Cashew Resin

An acid resistant vessel equipped with a stirrer, thermowell, and Dean Stark Trap with a reflux condenser mounted on top was charged with the following materials:

1. 45.2 gm of MFDPO with equivalent weight 266
2. 255.4 gm of treated cashew nut shell liquid (CNSL) which is composed mainly of the following phenolic compound

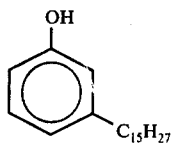

where $C_{15}H_{27}$ is an alkenyl group with an average of 2 unsaturated sites.

3. a catalyst comprising
   a. 2.6 gm of oxalic acid
   b. 0.6 gm of dodecylidphenyloxide disulfonic acid (35% solution in methylene chloride)

This mixture was slowly heated to 150° C and allowed to react until 6 ml of methanol had collected in the Dean Stark Trap. The trap was then removed, the reflux condenser mounted to the reaction vessel, and the mixture in the vessel allowed to cool to 100° C. At this time (4) 38.6 gm of 37% aqueous formaldehyde solution was added dropwise to the mixture over a 1 hour period. After 45 minutes, water was removed by distillation. Finally, the resulting resin was dehydrated by vacuum distillation at 20 mm Hg and at a temperature of 130° C.

On cooling to room temperature, a black-colored highly viscous liquid resin was obtained. The resin, when mixed with 15% by weight Hexa, had a stroke cure rate of 47 seconds at 185° C. A commercially available cashew nut shall liquid (CNSL) resin cured in 20 sec. under the same conditions.

EXAMPLE 5

Thermal Stability Comparison

A commercially available CNSL resin was used as a standard of comparison for thermal stability evaluation of the above resin. A quantity (8.5 gm) of each resin (Ex. 4 and CNSL resin) was mixed with 1.5 gm of Hexa and each mixture dissolved in 20 ml of a solvent composed of toluene/ethanol (75/25 by volume). To each solution 2 ml of cyclohexanone was added to prevent phase separation of the solvent system.

Portions (2 ml) of each of the above solutions were placed in tared aluminum foil pans. The solvent was evaporated and the resins cured into thin films by slowly heating from 40° to 225° C over a 24-hour period. The films were then placed in an oven at 260° for 1 hour, cooled, and weighed. These film weights were used as initial weights for future weight loss calculations.

The films were returned to the 260° C oven and removed at various time intervals, weighed and percent weight loss calculated. The films were left in the 260° C oven for a total of 500 hours.

A comparison of percent weight loss vs. time is shown in Table III. Inspection of this data shows that adding MFDPO to the cashew nut resin structure results in a significant increase in thermal stability.

TABLE III

| Commercial CNSL Resin | | Example 4 | |
| --- | --- | --- | --- |
| Hours at 500° F | % Wt. Loss | Hours at 500° F | % Wt. Loss |
| 1 | 0.6 | 1 | 0.4 |

TABLE III-continued

| Commercial CNSL Resin | | Example 4 | |
|---|---|---|---|
| Hours at 500° F | % Wt. Loss | Hours at 500° F | % Wt. Loss |
| 18 | 4.5 | 18 | 2.8 |
| 90 | 9.6 | 90 | 6.3 |
| 168 | 12.5 | 168 | 8.6 |
| 260 | 15.0 | 260 | 10.8 |
| 354 | 17.9 | 354 | 13.6 |
| 500 | 26.0 | 500 | 19.4 |

EXAMPLE 6

Preparation of CNSL Modified Resin

In the manner of Example 1A, 359.1 g of MFDPO (266 equiv. wt.) was reacted with 470.0 g phenol using 1.8 g of p-toluenesulfonic acid as catalyst.

After cooling the mixture to 100° C, 8.3 g of CNSL was added, followed by 280.8 g of formaldehyde. Water was removed and the resin dehydrated as in Example 1A. The resulting solid resin had a softening point of 90° C.

EXAMPLE 7

A. The modified novolac resin of Example 1A above was ground in a mortar to pass a 100 mesh sieve. A quantity (13.6 gm) of the ground resin, 1.1 gm of Hexa, (8% by wt. based on resin) and 57.3 gm of a standard asbestos brake lining mixture were intimately mixed. This charge was placed in a 3-inch diameter circular mold which was preheated to 310° F in a hydraulic press. The mixture was cured for 10 minutes at a pressure of 2000 psi. The molded piece was then "C" clamped between two metal plates and post-cured in an oven at 425° F for 2 hours.

B. In a similar manner the resin of Ex. 4A was mixed with Hexa (8.5% by weight) based on the resin and with a standard asbestos brake lining mixture and molded and cured as above (Part A).

C. In a similar manner the resin of Ex. 6 was mixed with 8.5% Hexa and a standard asbestos brake lining mixture was molded and cured as above (Part A).

EXAMPLE 8

Frictional Tests

A. To show that the frictional materials prepared in Example 7 employing the MFDPO resins of the present invention make superior brake linings, samples of a material made as in Example 7A and 7C were tested in a device which measured the coefficient of friction vs. temperature. A good brake lining material will maintain a relatively constant coefficient, decreasing or increasing only slightly, as temperature increases as it would under repeated and/or severe application of brakes.

For the product of 7A the coefficient of friction decreased from a value of about 0.55 to about 0.35 over a temperature rise of from about 200° to about 560° F, while the product of 7C over the same temperature rise changed from about 0.55 to about 0.30. Both of these materials showed a relatively smooth progression, i.e., rate of decrease, in the coefficient of friction over the given temperature rise. Both qualified as satisfactory brake lining materials.

B. In a second test employing a brake dynamometer simulation of the currently used Federal Motor Vehicle Safety Standard test (FMVSS-105a) brake requirement, a loading equivalent to 1840 pounds per front wheel was used. The total wear (measured in weight loss) and maximum fluid displacement (a measure of brake pedal travel during a stop) is shown graphically below for the product of 7C above. Other commercially used brake lining materials were tested in identical fashion and are shown for comparison as D, E, F, and G.

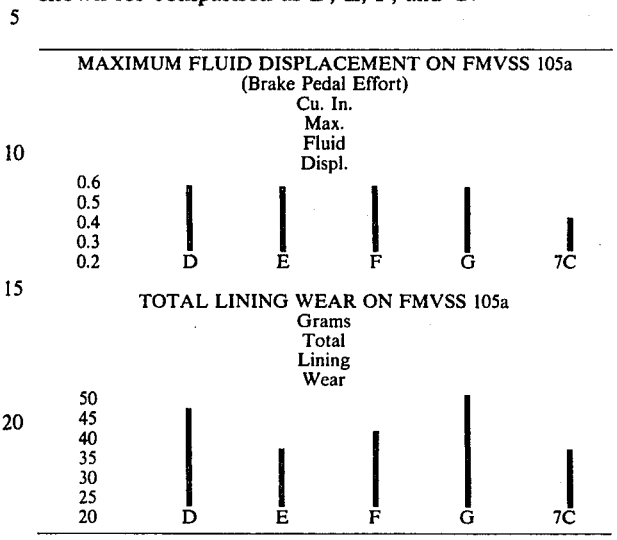

In this severe test most frictional materials change in effectiveness (friction level) during the course of the test. It is evident from the above figures that only 7C provides for low fluid displacement (minimal variation of effectiveness) and yet retains extremely low total lining wear. These results thus show that the subject materials of this invention are superior to the frictional materials taught in the prior art as represented by runs D, E, F and G.

We claim:

1. An improved frictional material which comprises a filler material and a cured modified novolac, prepared by reacting
   1. a methoxy functional diaryl compound with
   2. a phenolic compound and
   3. formaldehyde in the presence of
   4. an acid catalyst at a temperature of from about 90° to about 190° C for from several minutes to several hours to form a modified novolac, grinding said novolac and mixing with a source of formaldehyde and said filler material, curing said mixture in a mold and heating under pressure for a sufficient time to form said improved frictional material.

2. The composition of claim 1 wherein the methoxy functional diaryl compound is a methoxy functional diphenyl oxide.

3. The composition of claim 2 wherein the phenolic compound is selected from the group consisting of phenol, cashew nut shell liquid, and mixtures thereof.

4. The composition of claim 3 wherein the filler material is asbestos.

5. The composition of claim 4 wherein the source of formaldehyde is hexamethylenetetramine.

6. The composition of claim 1 wherein the curing is accomplished by heating at a temperature of from about 170° to about 260° C at a pressure of 500 to 2500 psi.

7. The composition of claim 3 wherein the acid catalyst is a mixture of oxalic acid and an aromatic sulfonic acid.

8. The composition of claim 3 wherein the acid catalyst is an aromatic sulfonic acid.

9. The composition of claim 3 wherein the acid catalyst is a strong mineral acid.

10. A process for preparing an improved frictional material which comprises reacting
 1. a methoxy functional diaryl compound with
 2. a phenolic compound and
 3. formaldehyde
in the presence of
 4. an acid catalyst at a temperature of from about 90° to about 190° C for from several minutes to several hours to form a modified novolac, grinding said novolac and mixing with a source of formaldehyde and filler material, curing said mixture in a mold and heating under pressure for a sufficient time to form said improved frictional material.

11. The process of claim 10 wherein the methoxy functional diaryl compound is a methoxy functional diphenyl oxide.

12. The process of claim 11 wherein the phenolic compound is selected from the group consisting of phenol, cashew nut shell liquid, and mixtures thereof.

13. The process of claim 12 wherein the filler material is asbestos.

14. The process of claim 13 wherein the source of formaldehyde is hexamethylenetetramine.

15. The process of claim 10 wherein the curing is accomplished by heating at a temperature of from about 170° to about 260° C at a pressure of 500 to 2500 psi.

16. The process of claim 12 wherein the acid catalyst is a mixture of oxalic acid and an aromatic sulfonic acid.

17. The process of claim 12 wherein the acid catalyst is an aromatic sulfonic acid.

18. The process of claim 12 wherein the acid catalyst is a strong mineral acid.

* * * * *

UNITED STATES PATENT AND TRADEMARK OFFICE
CERTIFICATE OF CORRECTION

PATENT NO. : 4,096,108

DATED : June 20, 1978

INVENTOR(S) : Benton P. Webb and Donald L. Nelson

It is certified that error appears in the above-identified patent and that said Letters Patent are hereby corrected as shown below:

In the ABSTRACT, second column, second and third lines after the structural formulas, after "consisting of hydrogen", the radical should be --

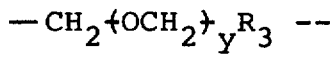

$$-CH_2 (OCH_2)_y R_3 --$$

Column 1, line 62, before "each $R_1$ represents..." insert the word --wherein--.

Column 2, line 4, the word "they" should be --then--;
line 27, the first word is --formaldehyde--.

Column 3, line 52, "0.03" should be --0.3--.

Column 4, line 36, the word "unit" should be --until--;
line 59, the word "at" should be --to--.

Column 5, line 39, the word "weighted" should be --weighed--;
line 66, delete "A." before MFDPO.

Column 6, line 18, the word is --dodecyldiphenyloxide--;
line 52, after "260°" insert --c.--.

Signed and Sealed this

Sixth Day of February 1979

[SEAL]

Attest:

RUTH C. MASON
Attesting Officer

DONALD W. BANNER
Commissioner of Patents and Trademarks